United States Patent [19]
Loyd, Jr.

[11] 3,886,907
[45] June 3, 1975

[54] GAS FUELED ROTARY ENGINE
[75] Inventor: Robert W. Loyd, Jr., Wyckoff, N.J.
[73] Assignee: Curtiss-Wright Corporation, Wood-Ridge, N.J.
[22] Filed: Dec. 12, 1973
[21] Appl. No.: 423,881

[52] U.S. Cl. ............................................. 123/8.13
[51] Int. Cl. ............................................ F02b 53/04
[58] Field of Search ......................... 123/8.13, 8.05

[56] References Cited
UNITED STATES PATENTS
3,196,847  7/1965  Kimberley ......................... 123/8.13
3,780,707  12/1973  Cole ................................. 123/8.13

Primary Examiner—Clarence R. Gordon
Attorney, Agent, or Firm—Victor D. Behn; Arthur Frederick

[57] ABSTRACT

A rotary combustion engine designed for operation on a gaseous type fuel in which the gas and air are supplied to the engine working chambers through separate intake passages.

8 Claims, 6 Drawing Figures

PATENTED JUN 3 1975      3,886,907

SHEET 1

GAS FUELED ROTARY ENGINE

BACKGROUND OF THE INVENTION

The invention relates to rotary combustion engines of the type disclosed in prior U.S. Pat. No. 2,988,065. Rotary combustion engines are generally operated on gasoline or diesel-type fuels which are liquid at normal atmospheric pressure and temperature conditions. It is known, however, to operate reciprocating piston-type combustion engines on a gaseous-type fuel, for example, propane or natural gas which is in the gaseous state at normal atmospheric pressure and temperature conditions. In such gas-fueled reciprocating engines it is known to supply the gas fuel to the engine intake or combustion chamber at above-atmospheric pressures of, for example, 15 p.s.i. The use of such gaseous fuels in a rotary combustion engine presents a problem because of the absence of valves in such engines. Because of the absence of valves in such engines and because the usual intake and exhaust ports overlap to some extent, if a gaseous fuel at above-atmospheric pressure is supplied to such a rotary combustion engine through the normal intake port, there is danger that a portion of the gas fuel will flow directly out through the exhaust port. This obviously not only is a waste of gaseous fuel but also adds to the unburned pollutants in the engine exhaust.

SUMMARY OF THE INVENTION

Accordingly, it is an object of this invention to provide a rotary combustion engine designed for operation on a gaseous-type fuel and in which danger of a portion of the fuel being wasted by flowing directly out through the exhaust port is eliminated.

A further object of the invention is to provide a rotary combustion engine designed for operation on a gaseous-type fuel in which the gas fuel is supplied through an intake port which is separate from the air intake port and is positioned so that there is no overlap of this gas intake port with the exhaust port and also so that it closes before the air intake port, whereby the air intake port can scavenge itself of any gas fuel before it closes.

In accordance with the invention, a rotary combustion engine is provided with a pair of intake ports, one for air only and one for gas only. A throttle valve is provided in each intake port passage and the throttle valves are interconnected with each other so that the flow of gas fuel is regulated in accordance with the air flow in order to achieve the desired fuel-air ratio at each air-flow condition. In addition, the gas and air intake ports are shaped and positioned so that the air intake port opens first and closes last. For this purpose, in the preferred embodiment of the invention, the two ports are disposed in one or both side housings of the engine. It is possible, however, to locate at least the air intake port in the intermediate or rotor housing of the engine rather than in a side housing.

Other objects of the invention will become apparent upon reading the following detailed description in connection with the drawings.

DESCRIPTION OF PREFERRED EMBODIMENTS

Figure 1:
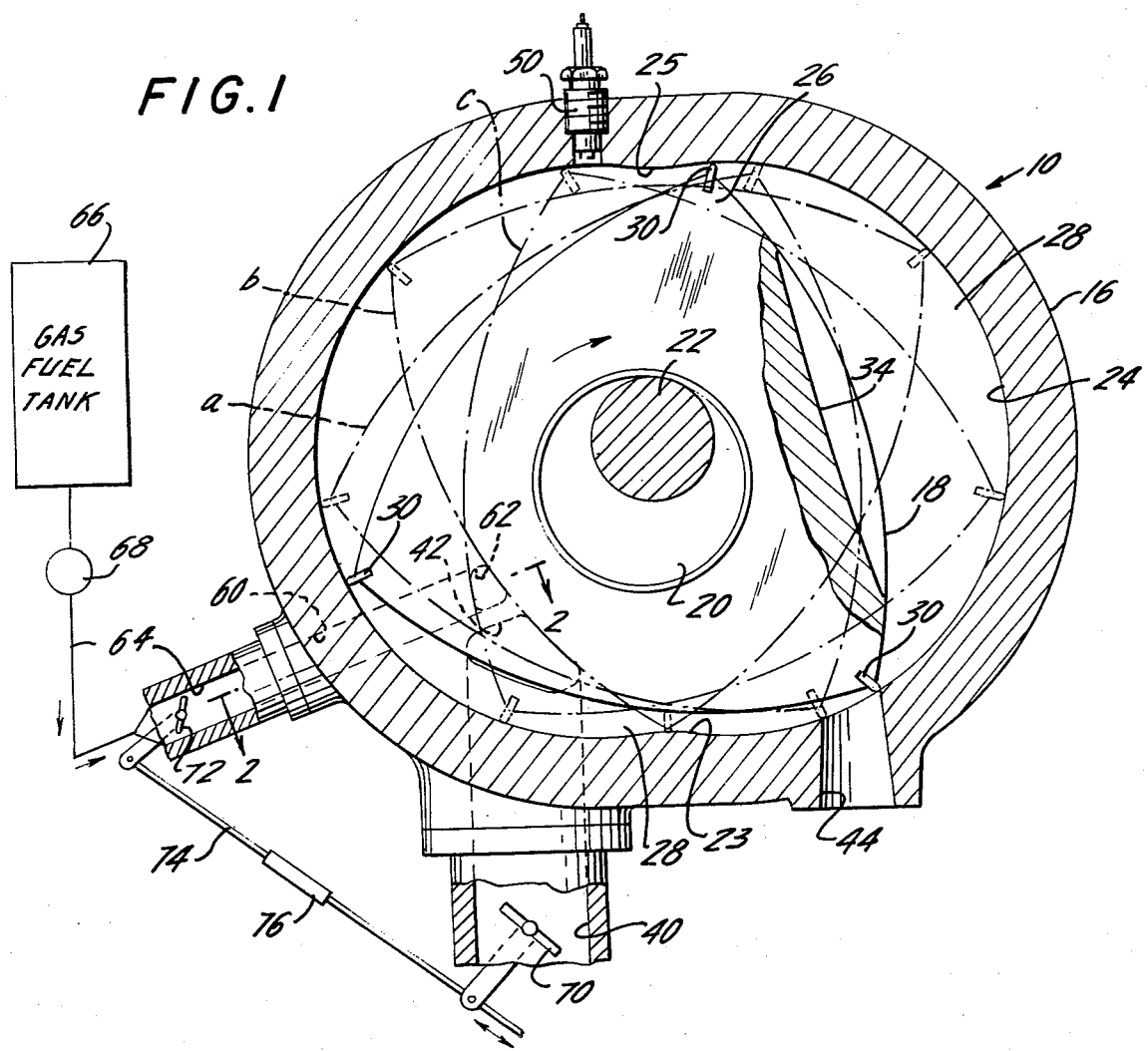
FIG. 1 is a schematic transverse sectional view illustrating a rotary combustion engine embodying the invention.
Figure 2:
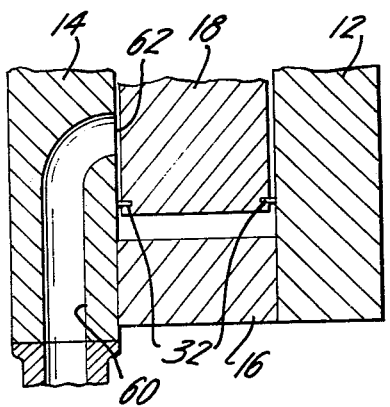
FIG. 2 is a sectional view taken along lie 2—2 of FIG. 1.

Referring to the drawing, particularly to FIGS. 1 and 2, a rotating combustion engine is schematically indicated at 10, the engine being generally similar to the type disclosed in said aforementioned patents. The engine 10 comprises an outer body or housing consisting of two axially spaced end housings 12 and 14 and an intermediate or rotor housing 16, the housings being secured together to form the engine cavity therebetween. An inner body or rotor 18 is journaled for rotation within said housing cavity on an eccentric portion 20 of a shaft 22 which extends coaxially through and is supported by bearings (not shown) in the end housings 12 and 14, said shaft being perpendicular to the inner walls of the end housings.

The peripheral inner surface 24 of the intermediate housing 16 is illustrated as having a two-lobe profile which preferably is basically an epitrochoid, said two lobes joining at junctions 23 and 25. The rotor 18 has a generally triangular profile with apex portions 26 having sealing cooperation with the trochoidal surface 24 to form three engine working chambers 28 between the rotor and the housings 12, 14 and 16. For this purpose, each of the rotor apex portions is provided with a seal 30 which extends across the rotor between the inner walls of the end housings 12 and 14 and the rotor also has suitable seals 32 on its end face for sealing contact with said end housing inner walls. Each of the three peripheral surfaces of the rotor preferably is provided with a trough-like recess 34.

The engine 10 also includes suitable gearing (not illustrated) between the rotor 18 and the engine housing to control the relative rotation of the rotor, such gearing is conventional and preferably is similar to that illustrated in the aforementioned patents.

An air intake passage 40 supplies air to an air intake port 42 disposed adjacent to and at one side of the junction 23 of the two lobes of the trochoidal peripheral surface 24. Said passage 40 extends through the housing end wall 14 and the port 42 opens through the inner wall of this end housing 14. An exhaust port 44 is formed in the intermediate housing 16 adjacent to and on the opposite side of said junction 23. The engine combustion is initiated in the engine working chambers 28 in the vicinity of the other junction 25 of the two lobes of trochoidal surface 24. For this purpose a spark plug 50 is mounted on the intermediate housing 16 adjacent to the lobe junction 25 with its electrodes disposed in a cavity opening through the trochoidal surface 24.

The engine structure so far described is conventional and is generally similar to that illustrated in the aforementioned prior patents. Reference is made to said prior patents for further details of such an engine including, for example, details of the rotor seals and the gearing between the rotor and housing. With such an engine, during engine operation and with the rotor rotating clockwise as viewed in FIG. 1, the volume of each working chamber 28 periodically increases from a minimum volume condition, when it is located adjacent to the lobe junction 23 and opens the intake port 42, to a maximum volume condition and closes the intake port and then said chamber decreases in volume to compress its intake charge until the working chamber again reaches a minimum volume condition, but this time at the lobe junction 25. Thereafter, the volume of said chamber again increases to a maximum and then decreases to a minimum as the chamber comes into communication with the exhaust port at the lobe junction 23 to complete the cycle.

In addition to the air intake passage 40, the engine 10 includes a fuel intake passage 60. As illustrated in FIG. 2 the fuel intake passage 60 is in the end housing 14 and opens through the inner wall of this end housing through a port 62. As already stated, the air intake passage 40 and the intake port 42 are similarly located in the end housing 14 except, however, as illustrated the air intake passage 40 and the intake port 42 are displaced from the fuel intake passage 60 and its port 62.

The fuel intake passage 60 is connected by a fuel supply line 64 to a fuel tank 66 containing a gas-type fuel. As herein used, a gas-type fuel is one, like natural gas or propane, which is in the gaseous state at normal atmospheric pressure and temperature conditions. A conventional pressure regulating and shut-off valve 68 is included for regulating the pressure of the fuel at its output side. That is, the pressure regulating valve is effective to maintain constant the pressure of the fuel supplied to the fuel intake passage 60. The pressure regulating valve 68 preferably is set to maintain a somewhat above atmospheric pressure in the fuel intake passage 60, for example, about 15 p.s.i. above atmospheric pressure.

The air intake and fuel intake ports 42 and 62 respectively are successively opened and closed to the working chambers 28 as these ports are uncovered and covered by the rotor 18 in response to its planetary-type rotary movement about the shaft 22. The manner in which the rotor 18 controls the intake and exhaust ports opening into the engine cavity as a result of this rotation is more fully described in the aforementioned prior patents, particularly in U.S. Pat. No. 2,988,065.

The configuration and location of the air intake port 42 and fuel intake port 62 preferably are such that the air intake port opens first to a working chamber 28 and closes last to this chamber. For this purpose, the fuel intake port 62 is disposed, relative to the direction of clockwise rotation of the rotor (indicated by an arrow in FIG. 1), in a downstream direction from the air intake port 42. In addition the downstream portion of the air intake port 42 extends closer to the trochoidal surface 24 than does the fuel intake port 62.

When the rotor 18 is in its full line position of FIG. 1, the air intake port 42 has, as illustrated, been opened slightly to the working chamber 28 then at the lower portion of FIG. 1, and the exhaust port 44 is about to be closed to this working chamber. When the rotor 18 reaches its *a* position (illustrated by dot and dash lines in FIG. 1) the exhaust port 44 has been fully closed to said working chamber 28 and the air intake port 42 has been opened almost to its half-open position but the fuel intake port 62 is still closed by the rotor 18 to said working chamber. When the rotor 18 reaches its *b* position (also illustrated by dot and dash lines in FIG. 1) both the air intake port 42 and the fuel intake port 62 are fully open to said working chamber 28. Thereafter when the rotor 18 reaches its *c* position (also illustrated by dot and dash lines in FIG. 1) the fuel intake port 62 has again been closed to this working chamber 28 but as illustrated, the air intake port 42 is still partly open to said working chamber 28. As the rotor 18 continues to rotate, the air intake port 42 also becomes closed by the rotor to said working chamber 28 whereupon, with continued rotation of the rotor, the fuel-air charge in said chamber 28 undergoes the remainder of its cycle, namely, compression, ignition by the spark plug 50, expansion and exhaust in essentially the same manner as described in said prior patents.

In conventional rotary engines of this type, there usually is some overlap between the air intake port and the exhaust port. Such an overlap is illustrated in the full line position of the rotor 18 in FIG. 1 when the exhaust port 44 is still open, although about to be closed, to a working chamber 28 and the rotor 18 has already slightly opened the intake port 42. However, with the relative position and configuration of the air intake and fuel intake ports 42 and 62 respectively, as shown in FIG. 1, there is no overlap of the fuel intake port 62 with the exhaust port 44. That is, the fuel intake port 62 does not open to a working chamber 28 until after the exhaust port 44 has been closed to that working chamber.

This non-overlap of the fuel intake port 62 and exhaust port 44 is important since the gas-type fuel is supplied to the working chamber 28 at an above atmospheric pressure. Accordingly, if there were any overlap between the fuel intake port 62 and the exhaust part 44 a portion of the fuel supplied to a working chamber would escape directly out of the exhaust port thereby wasting fuel.

As already described, the fuel intake port 62 closes first to each working chamber 28, that is, before the airintake port 42 closes to that working chamber. This is also important because in this way the air entering each working chamber 28 after the fuel intake port 62 has been closed to that chamber, scavenges the air intake passage 40 and its port 42 of any fuel which may have entered that passage when the air intake port 42 and the fuel intake port 62 were both open to such chamber. As a result, each working chamber 28 receives only the controlled quantity of fuel supplied by the fuel intake passage 60 while its port 62 is opened to said chamber.

In order to control the quantity of air and fuel supplied to each working chamber 28, the air intake passage 40 and the fuel intake passage 60 are provided with throttle valves 70 and 72 respectively. The throttle valves 70 and 72 are interconnected by suitable linkage 74 which is movable, as indicated by the double-ended arrow in FIG. 1, to vary the power output of the engine. The interconnection between the air and fuel throttle valves 70 and 72 serves to control the fuel-air ratio of the combustible fuel-air mixture supplied to each working chamber 28. The linkage 74 preferably includes suitable adjusting means schematically indicated at 76, which may be a turn-buckle type element, so that the relative positions of the two throttle valves 70 and 72 can be adjusted so as to provide the desired fuel-air ratio.

Figure 3:
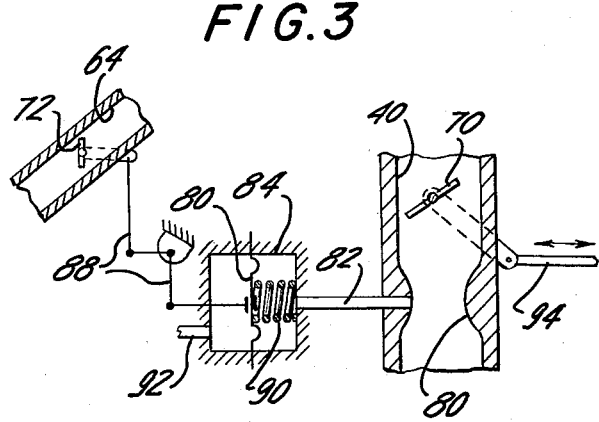
FIG. 3 is a view showing a modified form of interconnection between the gas and air throttle valves.

Instead of mechanically interconnecting the throttle valves 70 and 72, other interconnecting means may be provided to control the fuel air-ratio of the fuel and air supplied to each working chamber 28. For example, as illustrated in FIG. 3 the air intake passage 40 is provided with a venturi 80 and the air pressure at the throat of the venturi is transmitted by a passage 82 to a closed chamber 84, one wall of which is formed by a flexible diaphragm 80. The flexible diaphragm 80 is connected with suitable linkage to the fuel throttle valve 72. A spring 90 acts on the flexible diaphragm in a direction to move the throttle valve in a closing direction. The backside of the flexible diaphragm 80, that is the side removed from the venturi pressure, is vented at 92, for example, to the atmosphere. A suitable linkage 94 is connected to the throttle valve 70 for varying the power output of the engine.

With this arrangement of FIG. 3 any increase in the venturi suction pressure as a result of an increase in the air flow through the passage 40, causes the diaphragm 86 to flex toward the right (as viewed in FIG. 3) against the spring 90 to move the fuel throttle valve 72 in an opening direction thereby controlling the fuel-air ratio of the combustible mixture supplied to each working chamber 28.

If desired, the engine 10 may be provided with any conventional supercharger for supplying air at above atmospheric pressures to the intake passage 40. In such case the pressure of the gas-type fuel supplied to the fuel intake passage would be correspondingly increased. Where a supercharger is used and the air intake port 42 and exhaust port 44 overlap as in FIG. 1, some of the air, because of its higher pressure, flows directly out through the exhaust port during the period of port overlap. This air flow through the exhaust passage helps to cool the exhaust passage.

Figure 4:
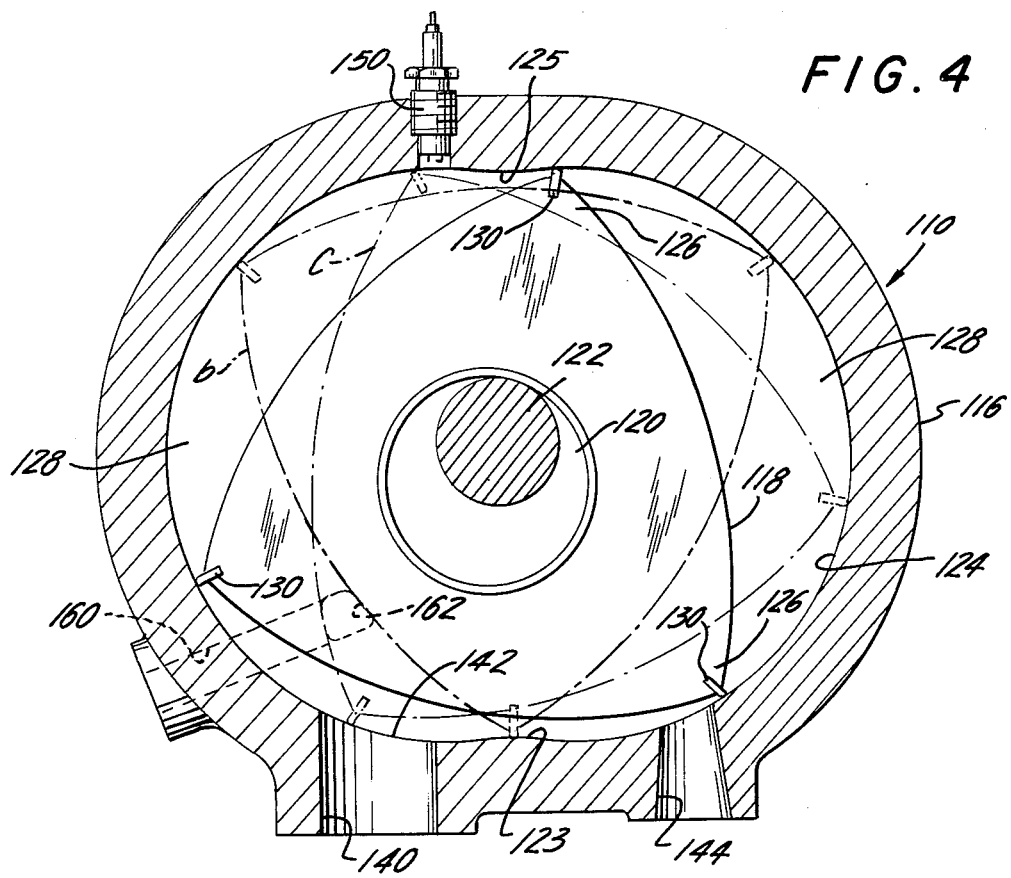
FIG. 4 is a view similar to the basic engine portion of FIG. 1 but illustrating a modified air intake port configuration.

In FIG. 1 the engine is illustrated as having an air inlet port 40 opening through the inner wall of the side housing 14. In lieu of this arrangement, the air inlet port like the exhaust port may be located in the intermediate housing 16. Such an arrangement is illustrated in FIG. 4. In FIG. 4 those parts corresponding to the parts of FIG. 1 are indicated by like reference numerals but with 100 added thereto.

Referring now to FIG. 4, the rotary engine there illustrated is identical to that of FIG. 1 except for the location of the air intake passage 140 and its port 142 which now pass and open through the intermediate housing 16 rather than through side housing 14 as in FIG. 1.

The full line position of the rotor 118 in FIG. 4 is identical to the rotor full line position in FIG. 1. In this rotor position there is some overlap between air intake port 142 and exhaust part 44. When the rotor 118 reaches its b position in FIG. 4 (identical to the b position of the rotor 18 in FIG. 1) the fuel intake port 62 is fully open as is the air intake port 142. When the rotor 118 reaches this c position in FIG. 4 (identical to the c position of the rotor 18 in FIG. 1) the fuel intake port 62 has just been closed but the air intake port 142 is still partly open. It is evident, therefore, that in the rotary engine of FIG. 4, the rotor 118 controls the fuel and air intake ports in essentially the same manner as in FIG. 1.

It is apparent, therefore, that the invention is not limited to the air intake passage passing either through a side housing 12 or 14 or through the intermediate housing 16. In fact, the engine could be provided with both an air intake passage in a side housing 12 or 14 and an air intake passage in the intermediate housing 16 in order to increase the air intake capacity of the engine. Also, in the case of intake port (either air or fuel) in the side housing 14, it is obvious that a corresponding intake port also could be located in the opposite side housing 12 thereby doubling the capacity of said ports.

Figure 6:
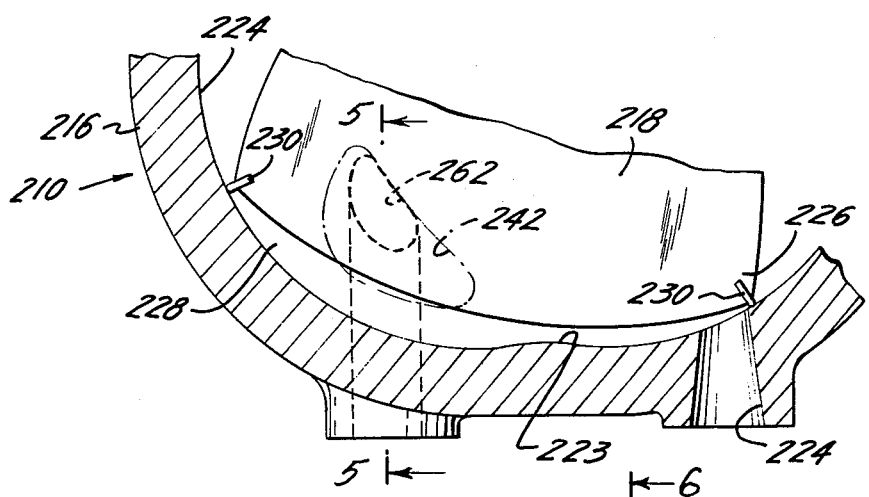
FIG. 6 is a view taken along line 6—6 of FIG. 5.
Figure 5:
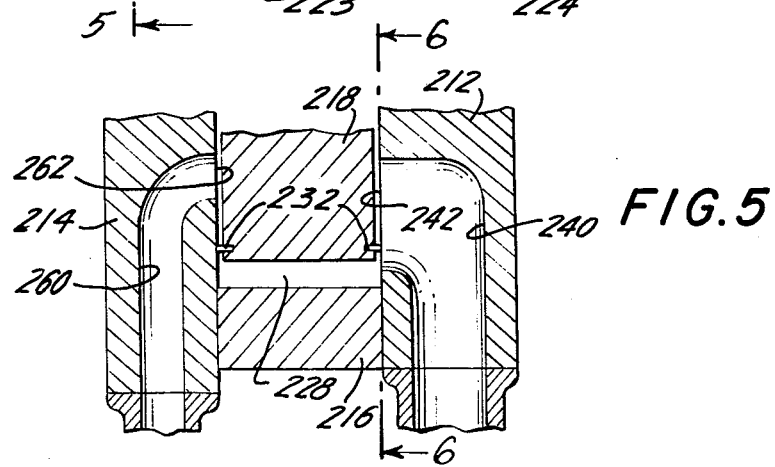
FIG. 5 is a view similar to FIG. 2 but showing a modified form of the invention, this view being taken along line 5—5 of FIG. 6.

A further modification of FIGS. 1 and 2 is shown in FIGS. 5 and 6. The parts of FIGS. 5 and 6 corresponding to the parts of FIGS. 1 and 2 are identified by the same reference numerals but with 200 added thereto. As best seen in FIG. 5 the fuel intake passage 260 is in the end housing 214 while the air intake passage 240 is in the other end housing 212. Hence, the fuel intake port 242 and air intake port 262 open through the inner walls of opposite end housings and therefore the size of these ports can be increased compared to the corresponding ports of FIG. 1. This is so since with the intake ports disposed in opposite end housings as in FIGS. 5 and 6, these ports no longer need to be spaced from each other as in FIG. 1 where they are on the same end housing. In FIG. 6 the air intake port 242 has been shown in phantom dot and dash outline on the inner wall of the end housing for the fuel intake port 262 to show the relative positions of these ports relative to the rotor 218. It is apparent from FIG. 6 that notwithstanding the substantial increase in size of these intake ports, the air intake port 242 opens to each working chamber 228 before the fuel intake port 262 does and the air intake port closes to said chamber after the fuel intake part in a manner similar to the opening and closing of the ports 42 and 62 in FIG. 1.

The invention clearly is not limited to the specific rotor engine configuration illustrated. For example, the trochoidal surface 24 could have more than two lobes with a number of rotor apex portions 26 being correspondingly increased. Such a rotary engine configuration is fully described in the aforementioned U.S. Pat. No. 2,988,065.

It should be understood that this invention is not limited to the specific details of construction and arrangement thereof herein illustrated and that changes and modifications may occur to one skilled in the art without departing from the spirit or scope of the invention.

What is claimed is:

1. A rotary combustion engine comprising:
   a. an outer body having a peripheral wall and axially-spaced side walls defining an internal cavity therebetween and also having first and second intake ports and an exhaust port with the inner surface of said peripheral wall having a multi-lobe profile;
   b. a shaft coaxial with said outer body cavity and having an eccentric portion;
   c. an inner body of generally polygonal profile journaled on said eccentric portion for relative rotation within said outer body, the apex portions of said inner body having sealing cooperation with said multi-lobe surface to define a plurality of working chambers which vary in volume in response to said relative rotation and the communication of said ports with said chambers being controlled by said relative rotation;
   d. a first passage for supplying a gaseous-type fuel at an above atmospheric pressure through said first intake port to said working chambers;

e. a second passage for supplying only air through said second intake port to said working chambers; and f. said two intake ports being so shaped and positioned that the second port opens to a working chamber before the first port and closes after the first port and in which said first intake port opens to a working chamber after the exhaust port is closed to that chamber.

2. A rotary combustion engine as claimed in claim 1, and including a throttle valve in said first passage and a throttle valve in said second passage and also including means interconnecting said valves to control the proportion of the above atmospheric pressure gaseous fuel and air supplied through said passages.

3. A rotary combustion engine as claimed in claim 1 and in which said two intake ports are each formed in a side wall of the outer body.

4. A rotary combustion engine as claimed in claim 1 and in which said two intake ports are formed in opposite side walls of the outer body.

5. A rotary combustion engine as claimed in claim 1 and in which said two intake ports are formed in the same side wall of the outer body.

6. A rotary combustion engine as claimed in claim 1 and in which said first intake port is formed in a side wall of the outer body and the second intake port is formed in said peripheral wall of the outer body.

7. A rotary combustion engine as claimed in claim 4 and in which said second intake port extends circumferentially in both directions beyond said first intake port.

8. A rotary combustion engine as claimed in claim 5 and in which said first intake port is positioned circumferentially beyond said second intake port.

* * * * *